US009026645B2

(12) United States Patent
Imbimbo et al.

(10) Patent No.: US 9,026,645 B2
(45) Date of Patent: May 5, 2015

(54) LAWFUL INTERCEPTION IN AN IP MULTIMEDIA SUBSYSTEM NETWORK

(75) Inventors: Amedeo Imbimbo, Caivano (IT); Alessandro Mordacci, Solna (SE); Giuseppe Amato, Salerno (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 78 days.

(21) Appl. No.: 13/101,236

(22) Filed: May 5, 2011

(65) Prior Publication Data

US 2012/0254403 A1  Oct. 4, 2012

Related U.S. Application Data

(63) Continuation of application No. PCT/EP2011/054801, filed on Mar. 29, 2011.

(51) Int. Cl.
G06F 15/173 (2006.01)
H04W 12/02 (2009.01)
H04L 29/06 (2006.01)

(52) U.S. Cl.
CPC ............ *H04W 12/02* (2013.01); *H04L 63/306* (2013.01)

(58) Field of Classification Search
CPC ..... H04L 67/20; H04L 63/306; H04W 12/02; G06F 14/173
USPC ........ 709/206, 223–224, 249, 250; 455/414.1
See application file for complete search history.

(56) References Cited

U.S. PATENT DOCUMENTS

| 6,122,499 | A  | * | 9/2000 | Magnusson | 455/405 |
| 7,231,218 | B2 | * | 6/2007 | Diacakis et al. | 455/456.1 |
| 7,277,702 | B2 | * | 10/2007 | Ropolyi et al. | 455/433 |
| 7,283,521 | B1 | * | 10/2007 | Ryan | 370/389 |
| 7,620,389 | B2 | * | 11/2009 | Kallio et al. | 455/414.1 |
| 8,149,725 | B2 | * | 4/2012 | Lipps et al. | 370/252 |
| 2004/0184452 | A1 | | 9/2004 | Huotari | |
| 2005/0152275 | A1 | * | 7/2005 | Laurila et al. | 370/241 |
| 2006/0034198 | A1 | * | 2/2006 | Makinen et al. | 370/310 |
| 2006/0268921 | A1 | * | 11/2006 | Ekstrom et al. | 370/437 |
| 2007/0258379 | A1 | * | 11/2007 | Ekstrom et al. | 370/250 |
| 2007/0287428 | A1 | * | 12/2007 | Diacakis et al. | 455/414.1 |

(Continued)

FOREIGN PATENT DOCUMENTS

RU  2316809  6/2005
WO  2006/117323 A1  11/2006

OTHER PUBLICATIONS

International Search Report and Written Opinion mailed Dec. 14, 2011 in corresponding Application No. PCT/EP2011/054801.

(Continued)

*Primary Examiner* — Oanh Duong

(57) ABSTRACT

A method and apparatus for providing lawful interception in an IMS network. A first node in an IMS network receives a message from a Lawful Intercept mediation system node instructing the first node to perform lawful interception on a target. The first node sends a subscribe request message towards a second node located in an IMS core network. The subscribe request message includes at least an identity of a service type to be monitored. The first node subsequently receives a notify message from the second node, the notify message including session information from which intercept related information can be derived. The first node then sends intercept related information towards the Lawful Intercept mediation system node.

12 Claims, 7 Drawing Sheets

(56) References Cited

U.S. PATENT DOCUMENTS

| | | | |
|---|---|---|---|
| 2008/0170117 A1* | 7/2008 | Xiao | 348/14.12 |
| 2008/0275988 A1* | 11/2008 | Zheng | 709/224 |
| 2008/0316998 A1 | 12/2008 | Procopio | |
| 2009/0017796 A1 | 1/2009 | Foti | |
| 2009/0097420 A1* | 4/2009 | Chiang et al. | 370/259 |
| 2011/0122770 A1* | 5/2011 | Iovieno et al. | 370/235 |
| 2011/0145888 A1* | 6/2011 | Park | 726/3 |
| 2011/0270977 A1* | 11/2011 | Ansiaux et al. | 709/224 |

OTHER PUBLICATIONS

Dhanagopal et al., "Lawful Interception on Session Border Controller Using SIP", Advanced Networks and Telecommunication Systems, 2$^{nd}$ International Symposium on, IEEE, pp. 1-3, XP031456216, Dec. 15, 2008.

3GPP TS 33.107 v8.11.0 (Dec. 2010); pp. 13, 14, 41, and 42.

ETSI TS 183 029 V1.1.1. (Apr. 2006); Telecommunications and Internet converged Services and Protocols for Advanced Networking (TISPAN); PSTN/ISDN simulation services: Explicit Communication Transfer (ECT); Protocol specification; France.

3GPP TS 33.107 V10.2.0 (Dec. 2010); 3rd Generation Partnership Project; Technical Specification Group Services and System Aspects; 3G security; Lawful interception architecture and functions (Release 10); France.

3GPP TS 33.108 V10.2.0 (Dec. 2010); 3rd Generation Partnership Project; Technical Specification Group Services and System Aspects; 3G security; Handover interface for Lawful Interception (LI) (Release 10); France.

ATIS-1000678.v2.2006(R2013); Lawfully Authorized Electronic Surveillance (LAES) for Voice over Packet Technologies in Wireline Telecommunications Networks, Version 2; American National Standard for Telecommunications; Washington, DC, USA, May 2006.

ETSI TS 102 232-5 V2.5.1 (Oct. 2010); Lawful Interception (LI); Handover Interface and Service-Specific Details (SSD) for IP delivery; Part 5: Service-specific details for Multimedia Services; France.

ITU-T Telecommunication Standardization Sector of ITU; Complement to ITU-T Recommendation E.164 (Feb. 2005), Annex to ITU Operational Bulletin No. 930-15.IV.2009; List of ITU-T Recommendation E.164 Assigned Country Codes; Geneva, Apr. 15, 2009.

Rosenberg, J., et al.; Network Working Group, Request for Comments: 3261; Obsoletes: 2543; Category: Standards Track; SIP: Session Initiation Protocol; Jun. 2002.

Roach, A. B.; Network Working Group, Request for Comments: 3265; Updates: 2543; Category: Standards Track; Session Initiation Protocol (SIP)-Specific Event Notification; Jun. 2002.

Garcia-Martin, M, et al.; Network Working Group, Request for Comments: 3455; Category: Informational; Private Header (P-Header) Extensions to the Session Initiation Protocol (SIP) for the 3rd-Generation Partnership Project (3GPP); Jan. 2003.

Network Working Group, Request for Comments: 2804; Category: Informational; IETF Policy on Wiretapping; IAB, IESG, May 2000.

Rosenberg, J., et al., Network Working Group, Request for Comments: 4575; Category: Standards Track; A Session Initiation Protocol (SIP) Event Package for Conference State; Aug. 2006.

* cited by examiner

LAWFUL INTERCEPTION IN AN IP MULTIMEDIA SUBSYSTEM NETWORK

This application is a continuation of International Application No. PCT/EP2011/054801, filed 29 Mar. 2011, the entire content of which is hereby incorporated by reference in this application.

TECHNICAL FIELD

The invention relates to the field of lawful interception in an IP Multimedia Subsystem network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically simplified scheme showing a generic deployment of an IMS common core, signalling and media gateways to an external network (1) or access network. A User Equipment (UE) 2 attaches vies a Proxy-Call/Session Control Function (P-CSCF) 3, which operate as a SIP proxies within the IMS control layer. The 3GPP architecture defines three types of CSCFs: the Proxy CSCF (P-CSCF) 3 which is the first point of contact within the IMS for a SIP terminal; a Serving CSCF (S-CSCF) 4, which provides services to the user that the user is subscribed to, and the Interrogating CSCF (I-CSCF), not shown, whose role is to identify the correct S-CSCF and to forward to that S-CSCF a request received from a SIP terminal via a P-CSCF. The application layer includes the IMS service network. Application Servers (ASs) 5 are provided for implementing IMS service functionality. The entities within the connectivity layer that connect the UE 1 to IMS services form a network that is referred to as the IP-Connectivity Access Network, IP-CAN. A description of the functional entities can be found in TS 23.002.

The IP Multimedia Core Network (CN) Subsystem comprises all CN elements for provision of multimedia services. This includes the collection of signalling and bearer related network elements as defined in TS 23.002. IP multimedia services are based on an IETF defined session control capability which, along with multimedia bearers, utilises the IP-CAN. In order to achieve access independence, and to maintain a smooth interoperation with wireline terminals and wireless terminals across the Internet, the IMS attempts conforms as far as possible with to IETF "Internet standards".

The IP multimedia core network subsystem (IM CN) allows PLMN operators to offer multimedia services based on and built upon Internet applications, services and protocols. While the IM CN does not standardize such services, it enables convergence of, and access to, voice, video, messaging, data and web-based technologies for wireless users, and combines the growth of the Internet with the growth in telecommunications.

Lawful Interception (LI) allows Law Enforcement Agencies (LEAs) to obtain communication network data for the purpose of analysis or gathering evidence. The data typically includes details of signalling, such as called and calling parties, and in some instances the contents of the call itself.

3GPP TS 33.107"Lawful interception architecture and functions" describes the architecture and functional requirements with a Third Generation Mobile Communication System. FIG. 2 shows a simplified architecture when LI is implemented in an IMS network. A Law Enforcement Monitoring Facility (LEMF) 6 may be located in a 3G network or any other network. An Administration Function (ADMF) 7 communicates with the LEMF 6. Note that more than one LEMF is shown because the ADMF 7 may communicate with several different LEMFs. Owing to different legal LI requirements, the LI information shared with different LEMFs may be different. For simplicity, the following discussing refers to a single LEMF 6. The ADMF 7 communicates with the LEMF 6 using a Mediation Function (MF) 8 via a HI1 interface. Delivery Function DF2 9 communicates with the LEMF 6 via a HI2 interface and is used to send Intercept Related Information (IRI) to the LEMF 1 using a MF 10. DF2 4 receives IRI from a CSCF 11 in the IMS network via an X2 interface. IRI may be triggered by events that are session related or session unrelated. Note that the configurations shown in FIG. 2 only depicts a logical representation of the entities involved in lawful interception; these may or may not be implemented as separate physical entities.

Another function of the ADMF 7 is to hide from the CSCF 11 the fact that there may be multiple activations by different Law Enforcement Agencies (LEAs) on the same target. The ADMF 7 may be partitioned to ensure separation of the provisioning data from different agencies. In the figure, the HI2 interface represents the interface between the LEA and the delivery function. The delivery function is used to distribute the IRI to the relevant LEA(s) via the HI2 interface.

The architecture shown in FIG. 2 allows that provision of IRI for SIP messages handled by the CSCF 11. Interception of call content (CC) for this case can be done at the GPRS Support Node (GSN) under a separate activation and invocation, according to the GSN, lawful architecture. For the IMS domain interception the CSCF 11 are the nodes specified as Intercept Access Points (IAPs) according to 3GPP TS33.107 for general interception in IMS. Such nodes can provide information related to the start and end of a SIP session, and copy the exchanged signalling. However, they cannot be aware of the actual service executed by the AS 5 handling the session for a specific intercepted communication session. The analysis of the intercepted SIP signalling intercepted in the CSCF 11 could give only a best effort interpretation of which service is executed by the AS 5.

To address this problem, 3GPP TS 33.108 introduced a new IMS conference interception specification that requires a different Intercept Access Point. The architecture is illustrated schematically in FIG. 3. When a user is taking part in a conference call, an AS 5 handles the conference call. The key elements for interception of conference services are the AS/Multimedia Resource Function Controller (MRFC) 12 and Multimedia Resource Function Processor (MRFP) 13. IRI associated with the conference services that are to be intercepted are reported by the AS/MRFC 12 while the call content associated with the conference service is reported by the MRFP 13 via DF3 14 and MF 15. Certain events must be reported as IRI. These include a notification of when a target requests that a conference be created, when a target successfully provisions a conference, when a target provisioned or requested conference is started (i.e., the first party is joined to the conference), when a conference that is a target of interception is started (i.e., the first party is joined to the conference), when interception is activated (on a conference or a conference owner) during an ongoing conference, and when parties have joined a conference and communication is started or enabled by the conference server in cases where the conference is a target of interception or when it is a target's conference.

If the target of interception has provisioned or requested a conference to be created, interception of IMS Conference Services begins regardless whether the target of interception has joined the conference. Interception of IMS Conference Services continues if the target of interception is on hold and the conference continues.

Further IRI that must be reported include the identity of current and potential conference participants, information about supported bearers, the conference initiator and/or controller, and a failure reason (if the conference should fail due to a problem).

The above information can only be obtained from the AS 5 performing the services, and an MMTEL conference is only an example of a more general service interception principle highlighted in which only the AS can provide service specific info about the executed services because it has the role to trigger, control and maintain the service status, generates new legs accordingly and handles the service error cases.

A problem arises when an IMS network is implemented in more than one country. It is possible to deploy an IMS network by having a centralized IMS system in a unique country, and other IMS functionality in different countries, as illustrated FIG. 4, in which a P-CSCF 3 is located in country 2 but other IMS nodes such as the S-CSCF 4 is located in country 1. This network architecture is attractive, for example, where several small countries can share elements of an IMS network.

In the example of FIG. 5, core IMS functions are provided in Country 1, and other IMS functions are provided in other countries (countries 2 to 7 are shown by way of example). The core IMS functions in country 1 include the Applications Server 5, the S-SCSF 4, the MRFC 16 and the MRFP 17. Other functions, such as the P-CSCF 3, are located in each of the other countries.

LI regulations provide that each national authority can order the interception of targets only on networks element installed in that country. A problem is that LEAs in countries different to country 1 cannot start interception on the nodes located in country 1. The LEA in, for example, country 2, can only start IMS interception on the P-CSCF 3 or the MRF (if locally deployed).

As described above, there are requirements for conference interception in 3GPP TS 33.108 and for all the services in ANS T1.678 to provide information related to a service accessed by a target user and, ETSI 102 232-5 introduces the requirement to provide a unique CIN (Communication Identification Number) for the legs belonging to the same communication. According to the current 3GPP and ANS LI specifications the only node able to reliably provide such information is the AS 5 executing the service, but if a multi-country IMS network deployment is used, the only node available for signalling interception in the hosted country is the P-CSCF 3. This problem is illustrated in FIG. 5, which it is shown that a LEA in country 2 cannot obtain IRI via an MF/DF 19 located in country 2 from an AS 5 located in country 1.

For example, an LEA requires an interception for user A 20 in the country 2 and delivery of IRI in 3GPP HI format. User A 20 starts a 3PTY call or creates and enters an adhoc or scheduled conference with users B 21 and C 22, where B 21 is located in the same country as A, and user C 22 is located in a different country (in this example, it is country 5, although it could be any other country including country 1).

The P-CSCF 3, which is the only allowed IAP for the LEA in country 2, provides the SIP signalling messages copy but the ADMF 7 and MF 19 cannot set warrant nor receive information about the executed conference service on the AS 5 as the As 5 physically resides in another country. As result, no conference events can be delivered to the LEMF 6 by the DF2 and, in most cases, the LEMF will not know the identities of the conference participants, when the conference starts and stops and the other info needed by 3GPP LI standards. A further problem is that even if user B 21 is also a target, and is intercepted in the conference case above, the LEA will have no way of knowing that user A 20 and user B 21 are in conference together, even though they are in the same country.

Multi-media telephony over IMS [mmtel] is become increasingly important and has been adopted as the voice solution for Long Term Evolution (LTE), and so intercepting voice calls where an AS is located in a different country is important. As other services, such as messaging, chat, video, social applications and sensor based services become more common, it is also desirable to be able to intercept these even where an AS providing those services is deployed in a different country.

A further reason that it is necessary to be able to obtain IRI from an AS deployed in a different country is that some LEAs use an ETSI 101 671 handover interface for IMS based telephony interception, which ensures that interception reports are received in the same format as reported for a circuit switched calls. If this is the case, then the service (e.g. call forwarding unconditional, call forwarding on busy subscriber, explicit call transfer, and so on) accessed by the user must be reported. This information is not present in the CSCF 11 and in the MRF, and it is not feasible to map available SIP signalling to this type of information. For this reason it is necessary to obtain IRI directly from the AS, but this is not possible when the AS is deployed in a different country.

SUMMARY

It is an object of the invention to allow a LEA in one country to obtain IRI relating to a user in that country, where the IRI is only available from a node in a different country. According to a first aspect, there is provided a method of providing lawful interception in an IMS network. A first node in an IMS network receives a message from a LI mediation system node instructing the first node to perform LI on a target. The first node sends a subscribe request message towards a second node located in an IMS core network. The subscribe request message includes at least an identity of a service type to be monitored. The first node subsequently receives a notify message from the second node, the notify message including session information from which IRI can be derived. The first node then sends IRI towards the LI mediation system node.

As an option, the first node and the second node are geographically located in different jurisdictions. Because the second node is not sending IRI related to a target, it can send session related information to the first node which is subsequently used to derive IRI.

The subscribe request message is optionally sent to an intermediate node in the IP Multimedia Subsystem core network, and the intermediate node forwards the subscribe request to the second node and at least one other node. This allows a single subscribe message to be sent and then forwarded on to many nodes As an option, the subscribe request message further includes any of an identity of a target to be monitored, an expiry time, a group of service types to be monitored, a country identification and a specific session to be monitored.

In an optional embodiment, the first node is a Proxy-Call Session Control Function, and the second node is an Application Server.

The intercept related information is optionally derived from any of a service instance identifier, identifiers of parties involved in a communication session, an identity of the originating user, a time of the session start, a service type, a service action, a failure reason, geographical information relating to any of the parties involved in the communication session, bearers supported by the communication session and information relating to encryption of the session.

According to a second aspect, there is provided a node for use in an IP Multimedia Subsystem network. The node is provided with a first receiver for receiving from a Lawful Intercept mediation system node a message instructing the node to perform lawful interception on a target. A first transmitter is provided for sending a subscribe request message from the node towards a second node located in an IMS core network. The subscribe request message includes at least an identity of a service type to be monitored. A second receiver is provided for receiving from the second node a notify message that includes session information from which intercept related information can be derived. A second transmitter is provided for sending a message towards Lawful Intercept mediation system node, the message including the intercept related information.

As an option, the subscribe request message further includes any of an identity of a target to be monitored, an expiry time, a group of service types to be monitored, a country identification and a specific session to be monitored.

The node is optionally a Proxy-Call Session Control Function.

As an option, the intercept related information is derived from any of a service instance identifier, identifiers of parties involved in a communication session, an identity of the originating user, a time of the session start, a service type, a service action, a failure reason, geographical information relating to any of the parties involved in the communication session, bearers supported by the communication session and information relating to encryption of the session.

The node is optionally provided with a processor for comparing identities contained in the intercept related information with an identity of the target subject to lawful interception, and only sending the message towards Lawful Intercept mediation system node in the event that the identity of the target subject to lawful interception matches an identity contained in the intercept related information.

According to a third aspect, there is provided a node for use in an IP Multimedia Subsystem core network, the node comprising a receiver for receiving from an IMS node located in an IP Multimedia Subsystem network a subscribe request message, the subscribe request message including at least an identity of a service type to be monitored. The node is also provided with a transmitter for sending to the IMS node, in the event that an event identified in the subscribe request message occurs, a notify message including session information from which intercept related information can be derived.

As an option, the intercept related information is derived from any of a service instance identifier, identifiers of parties involved in a communication session, an identity of the originating user, a time of the session start, a service type, a service action, a failure reason, geographical information relating to any of the parties involved in the communication session, bearers supported by the communication session and information relating to encryption of the session.

According to a fourth aspect, there is provided a method of operating a node for use in an IP Multimedia Subsystem core network. The node receives, from an IMS node located in an IMS network, a subscribe request message, the subscribe request message including at least an identity of a service type to be monitored. In the event that an event identified in the subscribe request message occurs, the node sends to the IMS node, a notify message including session information from which intercept related information can be derived.

According to a fifth aspect, there is provided a computer program, comprising computer readable code which, when run on a node causes the node to perform the method described above in the first aspect.

According to a sixth aspect, there is provided a computer program comprising computer readable code which, when run on a node causes the node to behave as a node as described above in the third aspect.

According to a seventh aspect, there is provided a computer program product comprising a computer readable medium and a computer program as described in either of the fifth and sixth aspects, wherein the computer program is stored on the computer readable medium.

DETAILED DESCRIPTION

Where an IMS network is deployed over more than one country, a node in a country that wishes to subscribe to IRI information from a node in another country sends a SIP SUBSCRIBE message to the node in the other country. A SIP event package is defined, and termed herein "Regulatory info event package". The SIP notification framework provides a mechanism that allows nodes to subscribe to other nodes in order to received events related to SIP based communication.

A node that wishes to receive IRI subscribes via a SIP SUBSCRIBE message to the URI of a resource that is statically or temporary allocated for the service execution. The SUBSCRIBE request contains a set of parameters that define options, conditions and the events type about which the subscribing node wishes to be informed. A further parameter that may be defined in the SIP SUBSCRIBE message is a country identification. Any suitable type of country identifier may be used, such as an E.164 based country identifier, one or a set geographical location coordinates, or access network specific info used in P-Access-Network-Info or IOI (Inter-Operator identifier).

Standard SIP authentication mechanisms are applied to ensure that the subscribing node is authenticated, and the notifier is responsible for implementing an authorization policy to regulate the access of the subscriber to the notification.

When the notifier has relevant information to send to the subscriber, the information is delivered in a message body of a SIP NOTIFY message sent towards the subscriber. A notification is sent only to subscriber nodes in the country in which the target users involved in the service are located. The user location can be obtained either by parsing the subscriber URI and matching it against the E.164 country identifier prefix, or analyzing a private header such as the P-Access-Network-Info or the IOI parameter in the P-Charging-Vector or by using a combination of these methods. Moreover a centralized AS in a multi-country deployment has most likely already knowledge or can retrieve (for example from Presence Group Management, PGM) information about the country from which the subscriber is calling in order to provide a service and determine under which conditions as well as in order to apply the right charging policy.

The confidentiality of the SUBSCRIBE and NOTIFY message bodies can be guaranteed using encryption such as S/MIME encryption, or another mechanism agreed between the subscriber and the notifier.

Figure 1:
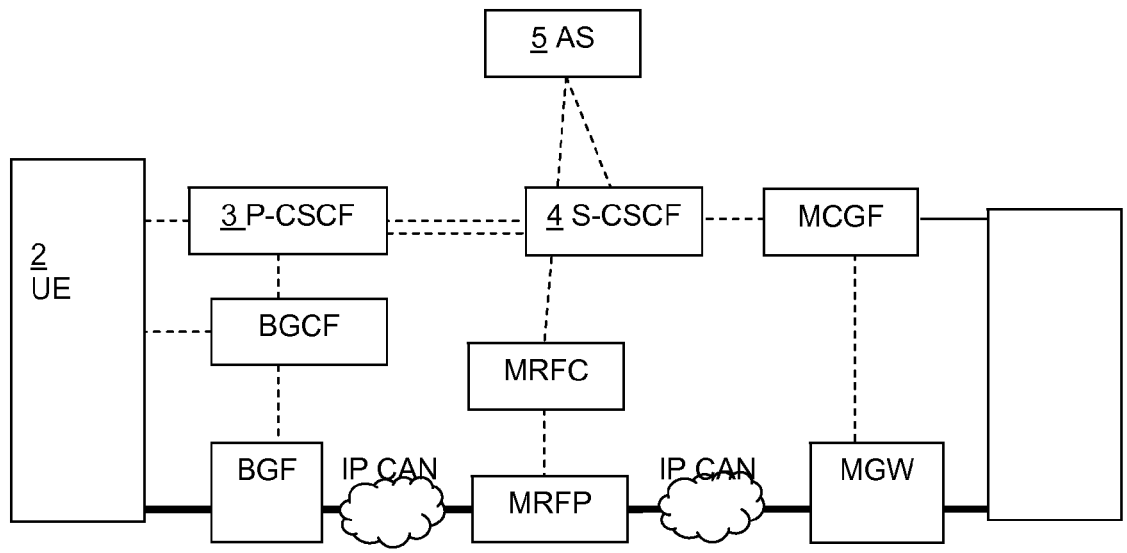
FIG. 1 illustrates schematically in a block diagram a simplified scheme for an IMS network.
Figure 2:
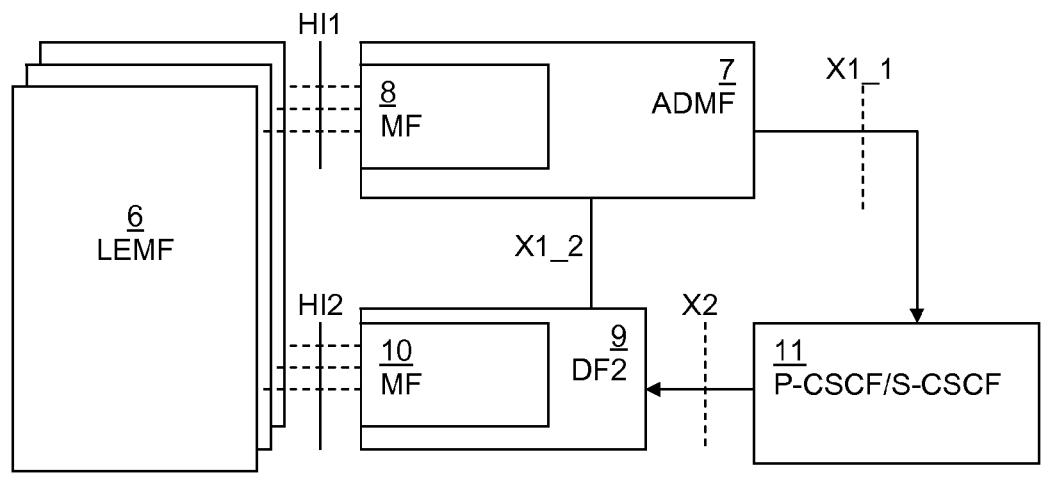
FIG. 2 illustrates schematically in a block diagram a network architecture for providing lawful interception in an IMS network.
Figure 3:
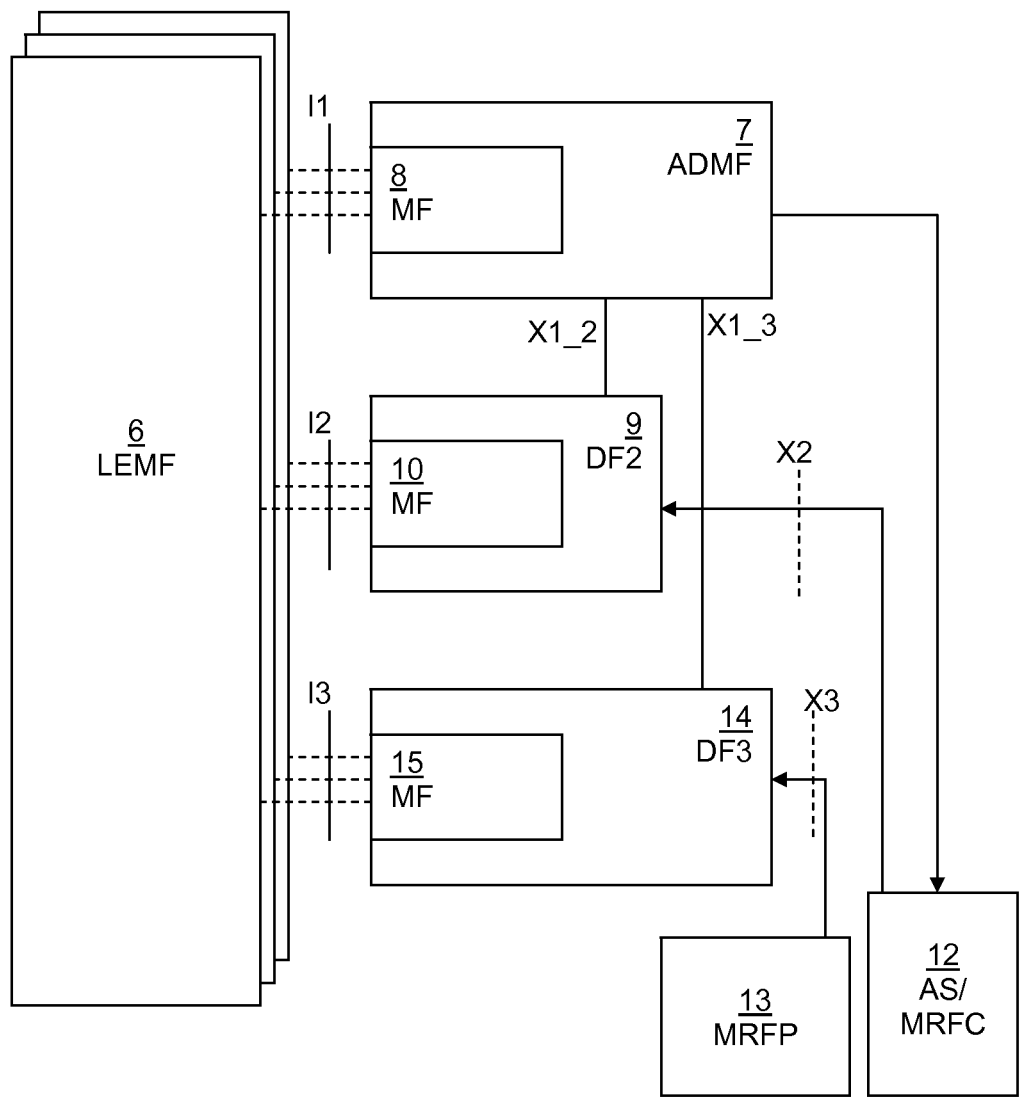
FIG. 3 illustrates schematically in a block diagram an alternative network architecture for providing lawful interception in an IMS network.
Figure 4:
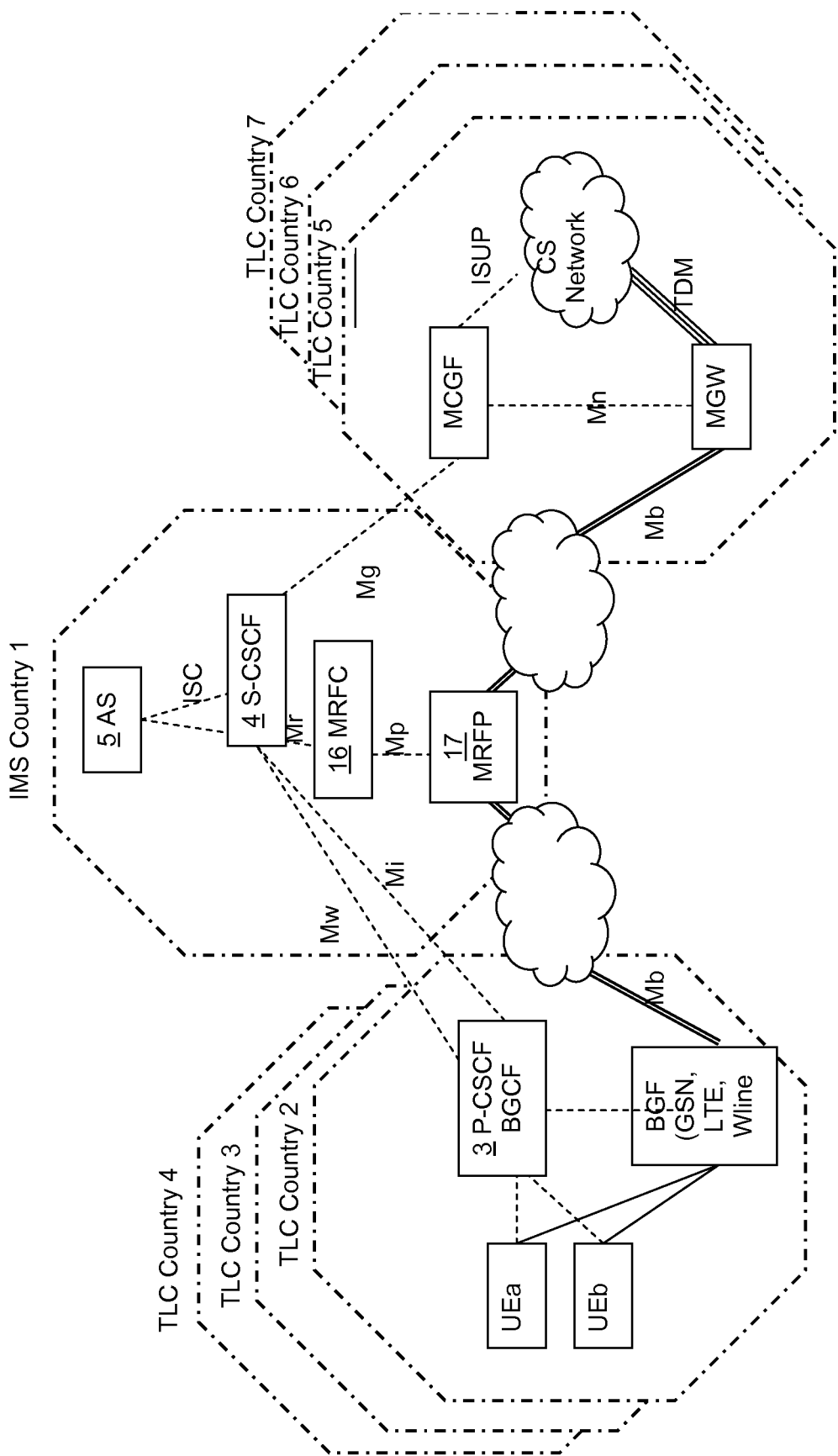
FIG. 4 illustrates schematically in a block diagram an IMS network where some nodes are deployed in different countries.
Figure 5:
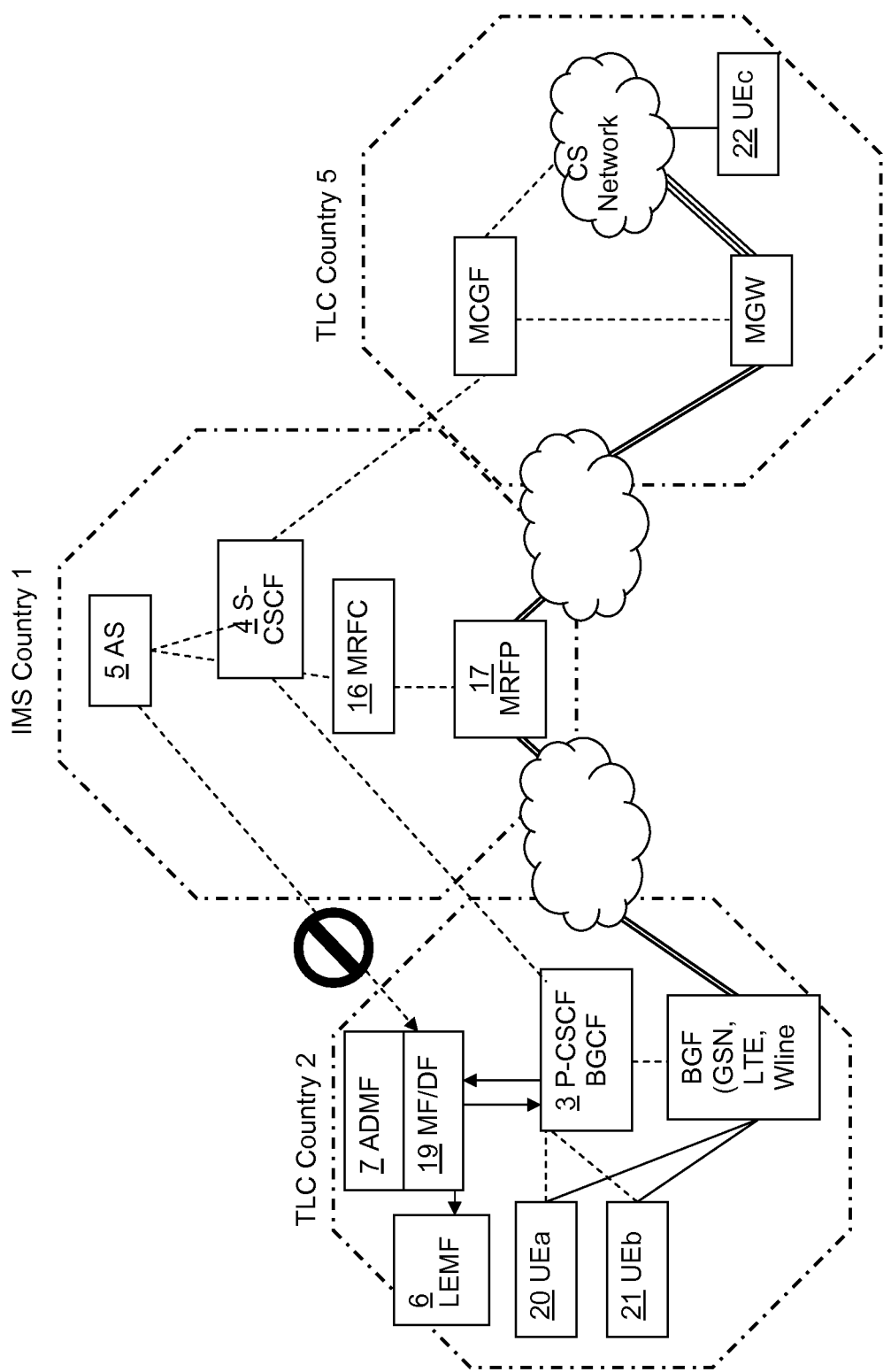
FIG. 5 illustrates schematically in a block diagram a problem with obtaining Intercept Related Information where a node is deployed in a different country.
Figure 6:
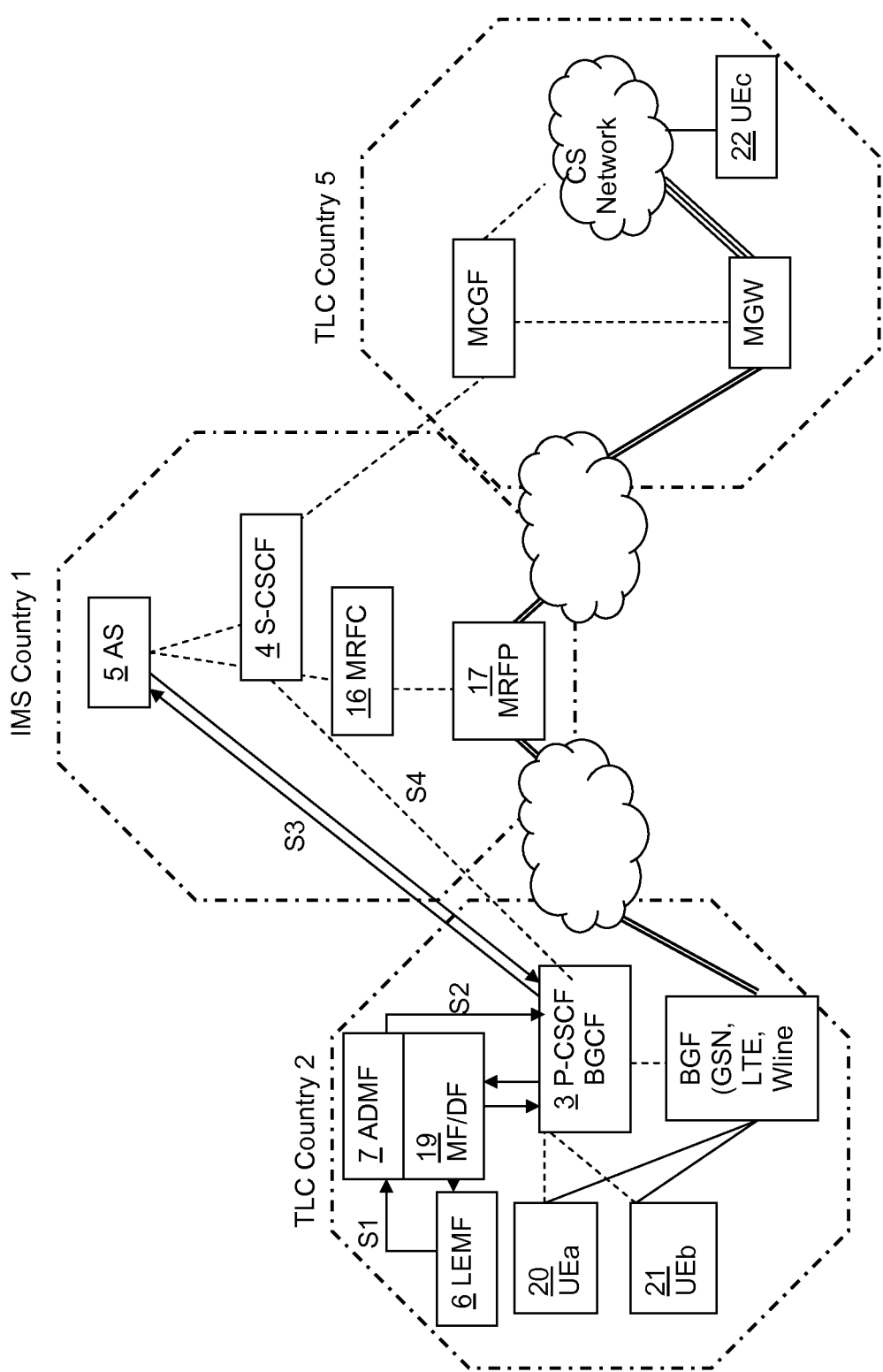
FIG. 6 illustrates schematically in a block diagram signalling for subscribing to Intercept Related Information where a node is deployed in a different country.

FIG. 6 herein shows an exemplary communication between nodes in order to subscribe to IRI, although it will be appreciated that other messaging paths may be used. The following numbering corresponds to the numbering of FIG. 6.

S1. The LEMF 6 in country 2 issues a warrant to monitor the communications that a target (in this example, UEa 20) is involved in. In this example, the warrant is issued towards the P-CSCF 3, but it will be appreciated that in other circumstances, the node could be a MGCF or another IAP.

S2. A message is sent to the P-CSCF 3 via an X1 interface from the ADMF 7, instructing the P-CSCF 3 to monitor the target located in the same country as the P-CSCF 3 (country 2).

S3. The AS 5 is located in country 1, whereas the P-CSCF 3 is located in country 2. The P-CSCF 3 therefore sends a SUBSCRIBE message to the AS 5, subscribing to service information relating to the target from the AS 5.

Note that in order to simplify the illustrated signalling, this step is shown as the P-CSCF 3 subscribing directly to the AS 5. However, a more flexible system is for the SIP SUBSCRIBE message to be sent towards a pre-defined URI that for example can be named "RegulatoryServiceInfo@TLCcountry1.com". The SUBSCRIBE message contains the options about which service or group of services that the P-CSCF wishes to receive notifications from, the expiry time, and optionally a specific user identifier or session to be monitored (if allowed by the central country). The default behaviour is to subscribe to all services events for the IMS user, since it does not reveal the identity of the target to the central country. Encryption options may be also set in this phase or pre-defined on the basis of national agreements. The SUBSCRIBE message is forwarded to all ASs in country 1, as it is not known at the time that the subscription is sent which IMS service will be executed, and from which AS. As each AS does not necessarily receive information about the target, the SUBSCRIBE message simply instructs it to send session related information (from which IRI can be derived) to the P-CSCF 3 for all users of the AS that meet the requirements of the SUBSCRIBE message. This ensures that LI is not occurring in the country in which the AS 5 is located.

Note that the SUBSCRIBE message need not contain the identity of a target; the P-CSCF 3 could subscribe to updates for services provided by the AS 5, and need only process notify messages from the AS 5 that relate to the target. However, the SUBSCRIBE message may identify a target user such that notify messages are only received at the P-CSCF if the target user is involved in a session handled by the AS 5. Furthermore, the SUBSCRIBE message may identify a particular session for which notifications are required.

S4. The AS verifies if the subscriber is allowed to receive the notification according to the local authorization policy and if ok, it will send the SIP OK message back confirming the activation of the subscription. A set of SIP error messages are described in RFC 3265 in the case of request rejection or a fault in the AS request handling.

Note that the signalling lines illustrated in FIG. 6 indicate a simplified logical SIP signalling flow. The actual SIP signalling path passes through the S-CSCF 4 and country Border Gateway, if any, according to standard SIP routing rules.

Figure 7:
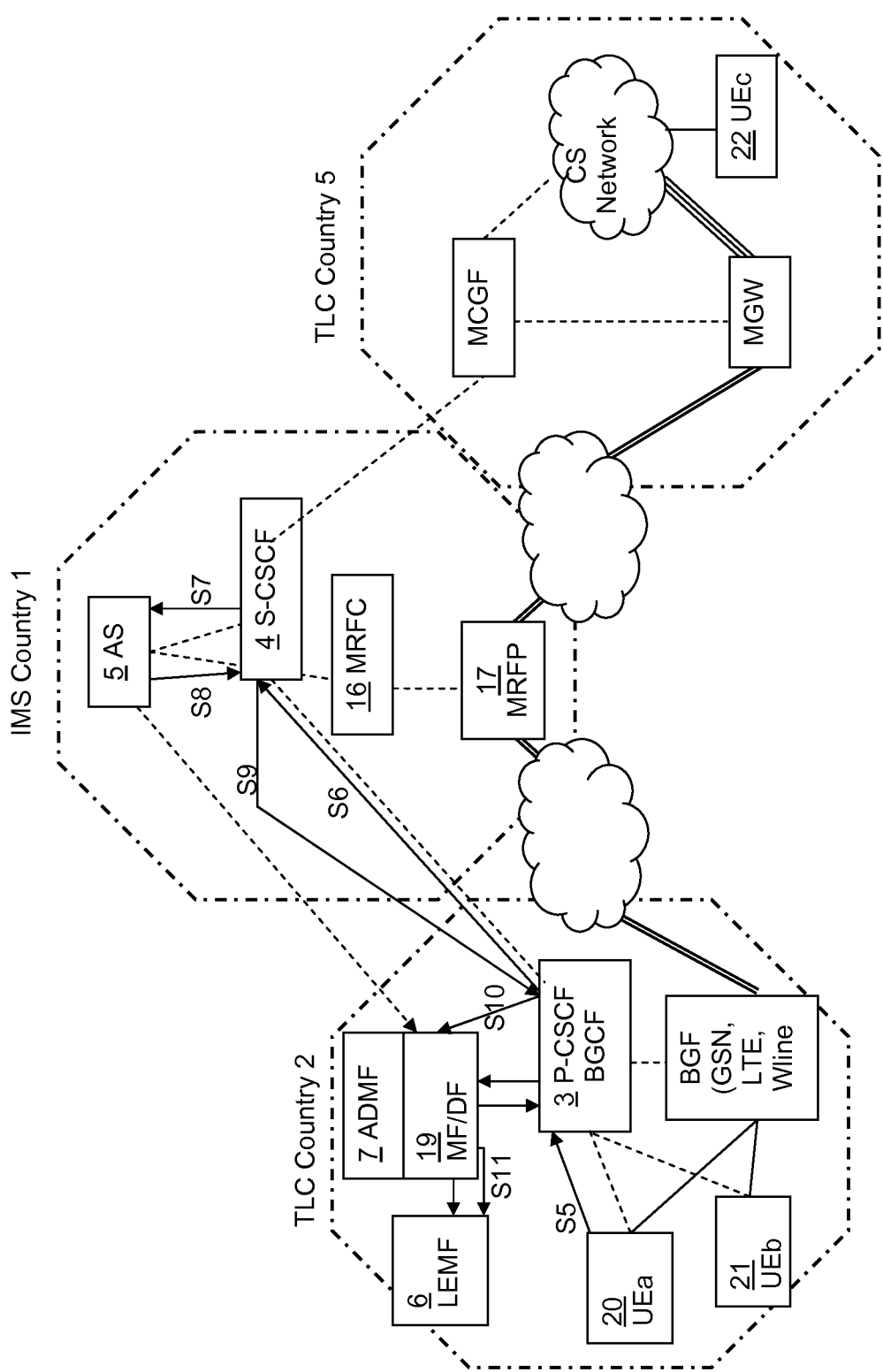
FIG. 7 illustrates schematically in a block diagram signalling for receiving Intercept Related Information where a node is deployed in a different country.

When the AS 5 receives the SUBSCRIBE message, it sends notifications related to the supplementary service event. This is illustrated in FIG. 7, with the following numbering corresponding to that of FIG. 7:

S5. User A in country 2, using UEa 20, initiates a SIP session. Other users, such as user B using UEb 21 in the same network, and user C, using UEc 22 in a different network, may take part part in the session. As the LEMF 6 has already issued a warrant to intercept User A's communication, the P-CSCF 3 starts the interception with User A is a target.

S6. The P-CSCF 3 forwards the SIP signalling to the centralized IMS in country 1.

S7. The S-CSCF 4 routes the call from User A to the appropriate AS 5 for the service execution (according to its role in the IMS architecture).

S8. The AS 5 executes the services (note: the AS may create new legs) and, owing to the fact that it has received a SUBSCRIBE message, generates the regulatory notification to the subscribed nodes. The notification contains the required IRI. In this case, the subscribed node is the P-CSCF 3 in country 2.

S9. The notification from the AS 5 is routed to the P-CSCF 3 in country 2 according to normal SIP rules. Note that the initial subscription for regulatory services has opened a dialog between the P-CSCF 3 and the AS 5.

S10. The P-CSCF 3 intercepts the regulatory notification (since it is contained in a SIP NOTIFY) and sends it to the DF2/MF2 19 encapsulated in an X2 event, because user A is a monitored user. The notification is discarded if it does not relate to a monitored used.

S11. The DF2/MF2 19 mediates the event and delivers the IRI with the service info to the LEMF 6 in the required HI2 format.

When the AS 5 sends a SIP notify, as described above in step S9, the content of the message is based on the information required by the relevant LI standards ETSI 102 232, ETSI/3GPP TS 33.107, TS 33.108 and ANS T1.678. While the notify message may relate to any kind of service, by way of example the following information is provided in the notify message where the service is a multimedia telephony service:

The SIP header provided in the NOTIFY message contains the URI originating the message, the dialog id, and a unique id of the event. The message body may include any of following communication session information:

- Unique service instance id, which is a unique identifier of the service for which the event has been reported. Note that the same communication session may have multiple service instances;
- Observed URI, which is a URI for which the subscription has been made;
- Parties Ids involved in the services, which include the identities of all participants in the communication sessions. This may be in the form of a TEL/URI list;
- Main call id, which is the call identities and charging identifier used in the first leg of the session initiated by the originating user;
- Child Call Ids, which include call identities and charging identifiers of a leg generated by the AS 5 due to B2BUA behaviour, or for the execution of a service requiring multiple legs, such as to a multiple subscriber; and
- Timestamp, which is a record of when the event occurred (typically in UTC time)

The message body may alternatively or additionally include any of the following service event information:

- Service Type, which gives details of the type of services executed (e.g. CFU, CCBS, 3PTY, CONF, HOLD, ECT etc);
- Service Action, which gives details of actions relating to the service (e.g. activation, start/stop/change etc.);
- Service Action Status State, which details the state of the service action (e.g. Requested, Pending, Successful, Suspended, Failed etc.);
- Service Description, which is a specific parameter to be reported for the service event;
- Failure Reason, which in general maps a SIP error response to a failure reason, but in the case where more that one SIP error has occurred a precise set of error messages may be defined; and
- Services Party changes, which includes changes relating to new parties, removed parties, canged parties, new callids, removed callids and modified Callds.

Furthermore, the message body may include any of the following optional information:

- Geographical Location of the participants, if available and meaningful for the service;
- Supported Bearers, which can be obtained from the SDP body exchanged between users during communication setup. Note that this parameter may be used for a case of on-going call interception; and
- Encryption details and keys (protected by encryption).

In an embodiment, a free information field is present in the message body to allow the notification of ad hoc additional info not covered by the examples given above.

The messages may be sent using an S/MIME encrypted envelope and signature in order to guarantee the confidentiality, integrity and authenticity of the notifications. There are many option for exchanging the necessary keys/certificates, which may be pre-shared or sent during the subscription.

When used with MMTEL services, the additional signalling required to comply with the subscription request is not expected to have a high impact on performance, as the frequency of use of the services is much less respect to normal voice calls. Note that the notifications are sent only to the nodes in the countries where the users involved in the notified service are located.

Figure 8:
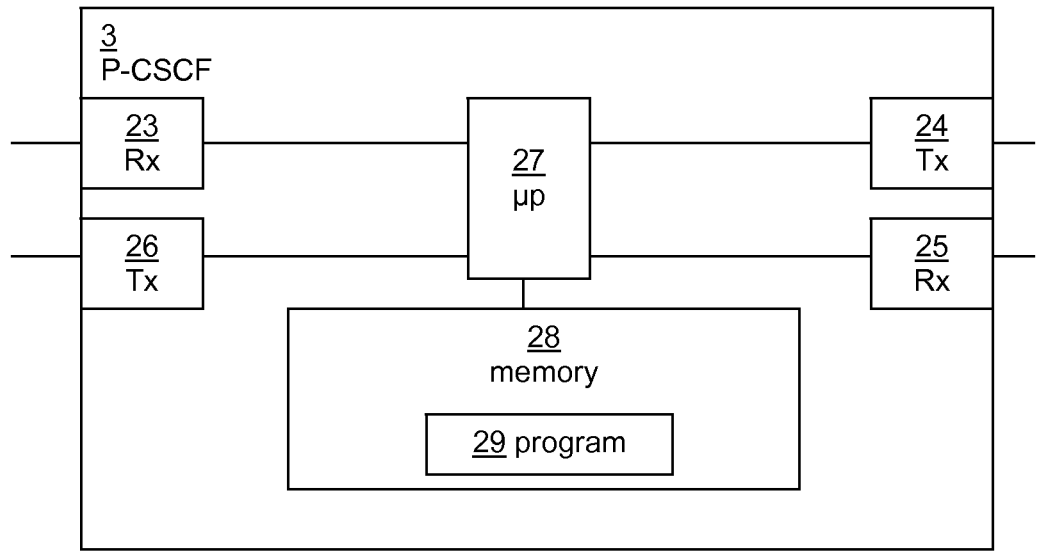
FIG. 8 illustrates schematically in a block diagram a node for use in the IMS network according to an embodiment of the invention.

Turning now to FIG. 8, there is shown a node such as the P-CSCF 3. The P-CSCF 3 is provided with a first receiver 23 for receiving a message instructing the P-CSCF to to perform LI on a target. A first transmitter 24 is provided for sending a SUBSCRIBE request message from the P-CSCF 3 towards the AS 5 located in the IMS core network. A second receiver 25 is provided for receiving from AS 5 a notify message including intercept related information. A second transmitter 26 is also provided for sending a message towards the MF/DF 19, the message including the intercept related information. A processor 27 is also provided for controlling the signalling. The processor 27 may also be used to compare identities contained in the IRI contained in the NOTIFY message with the identity of the target subject to lawful interception before sending the message towards the MF/DF 19.

The P-CSCF 3 may also be provided with a computer readable medium in the form of a memory 28. The memory 28 may be used to store a computer program 29 which, when executed by the processor 27, causes the P-CSCF 3 to behave as described above.

Figure 9:
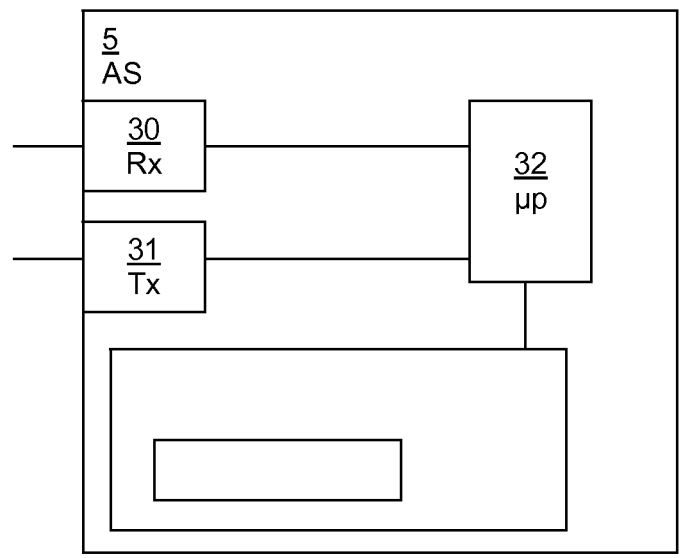
FIG. 9 illustrates schematically in a block diagram a node for use in the IMS core network according to an embodiment of the invention.

FIG. 9 illustrates a node such as an AS 5 located in the IMS core network. The AS 5 is provided with a receiver 30 for receiving subscribe request message from the P-CSCF 3. The subscribe request message includes at least an identity of a session type to be monitored. A transmitter 31 is provided for sending a notify message including IRI in the event that and event monitored occurs. A processor 32 is provided for controlling the signalling. While the AS may be an IMS telephony AS, it will be appreciated that the invention may be applied to any type of AS.

The AS 5 may also be provided with a computer readable medium in the form of a memory 33. The memory 33 may be used to store a computer program 34 which, when executed by the processor 32, causes the AS 5 to behave as described above.

The invention allows regulatory requirements with respect to LI to be fulfilled even in the case of a geographically centralized IMS network, in which a core node that includes the required information for LI is not located in the same jurisdiction as the LEA. This is achieved by providing a mechanism for conveying LI information about a service executed for an IMS user from centralized IMS nodes to an IMS node located in the same jurisdiction as the LEA.

The impacts of the proposed changes to signalling do not affect many nodes, and the invention re-uses existing IMS network infrastructure. No dedicate network connection are needed. Furthermore, the invention allows a multi-vendor environment to be more easily integrated using such information. The invention has flexibility, in that it allows the P-CSCF to subscribe to all or to a part of the service information and to all or only to the target subscribers according to network characteristics and regulatory requirements.

In a scenario in which the P-CSCF is able to control the media layer, it can use the notification information to enhance the triggering criteria of call content (CC) interception, which can reduce duplicated interception, and allow filtering of irrelevant or uninteresting media streams.

Any IMS node can subscribe for notifications on the basis of a single communication session, a monitored user, or any service events according to what is permitted by the local laws in the country of the node and the country of the IMS core network. The notification received by the subscribed node is then delivered as additional IRI to the DF2/MF2 19 and then to the LEMF 6.

It will be appreciated by the person of skill in the art that various modifications may be made to the above-described embodiments without departing from the scope of the present invention. For example, while some of the examples given above refer to MMTEL services, it will be appreciated that the invention applies equally to other types of service provided by a node in the IMS core network, such as conference services and so on. Furthermore, while the invention is described such that the P-CSCF 3 subscribes to the AS 5, another node may subscribe, such as a MRFC or a P-CSCF/Breakout Gateway Control Function (BGCF).

The following acronyms have been used in the above description
ADMF Administration Function
AS Application Server
BGCF Breakout Gateway Control Function
B2BUA Back-to-Back User Agent
CC Call Content
CIN Communication Identification Number
CN Core Network
CSCF Call Session Control Function
DF Delivery Functions
IAP Intercept Access Point
I-CSCF Interrogating-Call Session Control Function
IMS IP Multimedia Subsystem
IOI Inter-Operator Identifier
IRI Intercept Related Information
LEA Law Enforcement Agency
LEMF Lawful Enforcement Monitoring Function
LI Lawful Interception
LTE Long Term Evolution
MF Mediation Function
MMTEL Multimedia Telephony
MRFC Multimedia Resource Function Controller
MRFP Multimedia Resource Function Processor
P-CSCF Proxy-Call Session Control Function
PGM Presence Group Management
PLMN Public land mobile network
S-CSCF Serving-Call Session Control Function
SDP Session Description Protocol
SIP Session Initiation Protocol
UA User Agent
UE User Equipment
URI Uniform resource Identifier

The invention claimed is:

1. A method of providing lawful interception in an IP Multimedia Subsystem network, the method comprising:
at a first node in an IP Multimedia Subsystem network, receiving from a Lawful Intercept mediation system node, a message instructing the first node to perform lawful interception on a target;
sending a subscribe request message from the first node towards a second node located in an IMS core network, the subscribe request message including at least an identity of a service type to be monitored;
receiving at the first node a notify message including session information from the second node, the session information including information from which intercept related information can be derived; and
sending from the first node towards the Lawful Intercept mediation system node a message, the message including the intercept related information,
wherein the first node and the second node are geographically located in different countries.

2. The method according to claim 1, wherein the subscribe request message is sent to an intermediate node in the IP Multimedia Subsystem core network, and the intermediate node forwards the subscribe request to the second node and at least one other node.

3. The method according to claim 1, wherein the subscribe request message further includes any of an identity of a target to be monitored, an expiry time, a group of service types to be monitored, a country identification and a specific session to be monitored.

4. The method according to claim 1, wherein the first node is a Proxy-Call Session Control Function, and the second node is an Application Server.

5. The method according to claim 1, wherein the intercept related information is derived from any of a service instance identifier, identifiers of parties involved in a communication session, an identity of the originating user, a time of the session start, a service type, a service action, a failure reason, geographical information relating to any of the parties involved in the communication session, bearers supported by the communication session and information relating to encryption of the session.

6. A node for use in an IP Multimedia Subsystem network, the node comprising:
a first receiver for receiving from a Lawful Intercept mediation system node a message instructing the node to perform lawful interception on a target;
a first transmitter for sending a subscribe request message from the node towards a second node located in an IMS core network, the subscribe request message including at least an identity of a service type to be monitored;
a second receiver for receiving from the second node a notify message including session information from which intercept related information can be derived; and
a second transmitter for sending a message towards Lawful Intercept mediation system node, the message including the intercept related information,
wherein the node and the second node are geographically located different countries.

7. The node according to claim 6, wherein the subscribe request message further includes any of an identity of a target to be monitored, an expiry time, a group of service types to be monitored, a country identification and a specific session to be monitored.

8. The node according to claim 6, wherein the node is a Proxy-Call Session Control Function.

9. The node according to claim 6, wherein the intercept related information is derived from any of a service instance identifier, identifiers of parties involved in a communication session, an identity of the originating user, a time of the session start, a service type, a service action, a failure reason, geographical information relating to any of the parties involved in the communication session, bearers supported by the communication session and information relating to encryption of the session.

10. The node according to claim 6, further comprising a processor for comparing identities contained in the intercept related information with an identity of the target subject to lawful interception, and only sending the message towards Lawful Intercept mediation system node in the event that the identity of the target subject to lawful interception matches an identity contained in the intercept related information.

11. A non-transitory, computer readable medium comprising computer readable code which, when run on a node, causes the node to provide lawful interception in an IP Multimedia Subsystem network performing the following:
receive from a Lawful Intercept mediation system node a message instructing the first node to perform law interception on a target;
send a subscribe request message from the first node towards a second node located in an IMS core network, the subscribe request message including at least an identity of a service type to be monitored;

receive a notify message including session information from the second node, the session information including information from which intercept related information can be derived; and send towards the Lawful Intercept mediation system node a message, the message including the intercept related information, wherein the first node and the second node are geographically located in different countries.

12. A computer program product comprising the non-transitory, computer readable medium in claim 11.

* * * * *